MAGNETIC TRANSDUCING HEAD FOR PHOTOCOPY MACHINE

Filed Feb. 3, 1967 4 Sheets-Sheet 1

INVENTOR.
JOACHIM H. TODT

BY Schroeder, Siegfried & Ryan
ATTORNEYS

MAGNETIC TRANSDUCING HEAD FOR PHOTOCOPY MACHINE

Filed Feb. 3, 1967 4 Sheets-Sheet 2

INVENTOR.
JOACHIM H. TODT
BY
Schroeder, Siegfried & Ryan
ATTORNEYS

Dec. 30, 1969 J. H. TODT 3,487,391

MAGNETIC TRANSDUCING HEAD FOR PHOTOCOPY MACHINE

Filed Feb. 3, 1967 4 Sheets-Sheet 3

INVENTOR.
JOACHIM H. TODT

BY Schroeder, Siegfried & Ryan
ATTORNEYS

INVENTOR.
JOACHIM H. TODT
BY Schroeder, Siegfried & Ryan
ATTORNEYS

United States Patent Office 3,487,391

Patented Dec. 30, 1969

3,487,391

MAGNETIC TRANSDUCING HEAD FOR PHOTOCOPY MACHINE

Joachim H. Todt, 7710 Bells Mill Road, Bethesda, Md. 20034

Filed Feb. 3, 1967, Ser. No. 613,799
Int. Cl. G11b *5/30*
U.S. Cl. 340—174.1 15 Claims

ABSTRACT OF THE DISCLOSURE

The disclosure is directed to the construction and method of making a magnetic recording head for use with computer read-out equipment or photocopy equipment requiring a high degree of resolution. The transducer head is made up of minute individual heads, stacked side-by-side and insulated from each other. The coils are angularly staggered from each other to provide proper spacing, there being approximately 100 heads for each 0.57 inch of transducer width. The transducer head also has a common magnetic element extending the width of the stack of individual elements and spaced from them to form a magnetic gap.

This invention relates to magnetic transducers and more particularly to an improved multiple element magnetic transducer and the method of making the same for use with magnetic recording media.

The method of fabricating the transducer consists primarily of arranging the minute elements on a jig and making all electrical connections, after which the assembly is potted in an epoxy resin and the jig is machined away to expose the individual styli of the transducer head which has a plate fixed adjacent thereto to form a magnetic gap and complete the head.

For a more detailed explanation of the type of machine which may utilize the aforesaid transducer, reference is made to my co-pending application entitled, "Facsimile Apparatus," Ser. No. 308,227, now Patent No. 3,301,948, and dated Sept. 11, 1963.

Multiple element magnetic transducers and transducers utilized with magnetic medium for recording and print-out are well recognized and in use. Recent improvements in magnetic recording equipment utilized in business machines and computers and the increased interest in photocopying apparatus has given rise to the need for improved magnetic transducers incorporated in the same. In the photocopying type apparatus, a need for a higher degree of resolution in copying has become evident and such accuracy and resolution is related to the number of core elements or individual scanning elements in the record head. Similarly, in business machines and computer equpiment, where storage of information is accomplished through a magnetic storage medium, the need for improved heads to record and pick off bits of information in higher quantities to speed up the operation of the machine has become apparent. In present day magnetic transducers, the physical size of the cores place a limitation on the type and performance of the machine. The physical core or stylus size prevents a larger number of individual elements or cores for a given width of storage medium to limit the amount of material stored or transferred therebetween. Further, the complexity in reducing the physical size gives rise to increased transducer cost and more difficulty in the manufacture of the same. In addition, the physical size of the transducer head limits its application in such equipment. In the field of photocopying, this physical size and the number of elements incorporated into a head, control to a large degree, the resolution of the ultimate copy obtained.

The present invention is directed to an improved method of making a transducer and to the structure of a magnetic transducer to be utilized with a magnetic recording media. In the present invention this improved magnetic transducer utilizes a considerably higher number of elements per head to give rise to a resulting structure which incorporates a substantially increased number of cores or elements for a given gap area on the recording medium. The improved structure incorporates in the neighborhood of 100 recording elements per half inch length of gap area such that a substantially increased number of elements can be obtained in a composite unit employing several heads for conventional widths in magnetic storage mediums. This will result in a higher resolution in case of photocopying machines and an increase in bits of information capable of being stored on a magnetic storage medium for computing purposes. The improved structure permits an improved method of assembly which substantially reduces the cost of the same and facilitates assembling the individual cores in a predetermined relationship to maintain a physical size limitation on the resulting magnetic transducer. Furthermore, the improved magnetic transducer incorporates discontinuous type core elements to physically reduce the size of the magnetic circuit with the addition of a plate of magnetic material operating as a sink to improve the operating characteristics of the transducer.

Therefore it is an object of this invention to provide an improved magnetic transducer for use with a magnetic storage media.

Another object of this invention is to provide an improved magnetic transducer utilizing a plurality of elements or core members for a relatively small area.

It is also an object of this invention to provide in a magnetic transducer of this type, a simplified arrangement of parts and a magnetic circuit utilizing discontinuous core members.

A further object of this invention is to provide in a magnetic transducer of this type, a simplified construction for a transducer head which will provide a large number of core elements for a given head dimension and a high degree of resolution in the operation of the same.

A still further object of this invention is to provide an improved method of making a magnetic transducer.

Another object of this invention is to provide an improved magnetic transducer which utilizes discontinuous core members with a provision for a magnetic sink to improve the operating characteristics of the individual magnetic circuits for the elements of the transducer.

These and other objects of this invention will become apparent from a reading of the attached description together with the drawings wherein.

Figures 1, 2, 3, 4, 5:
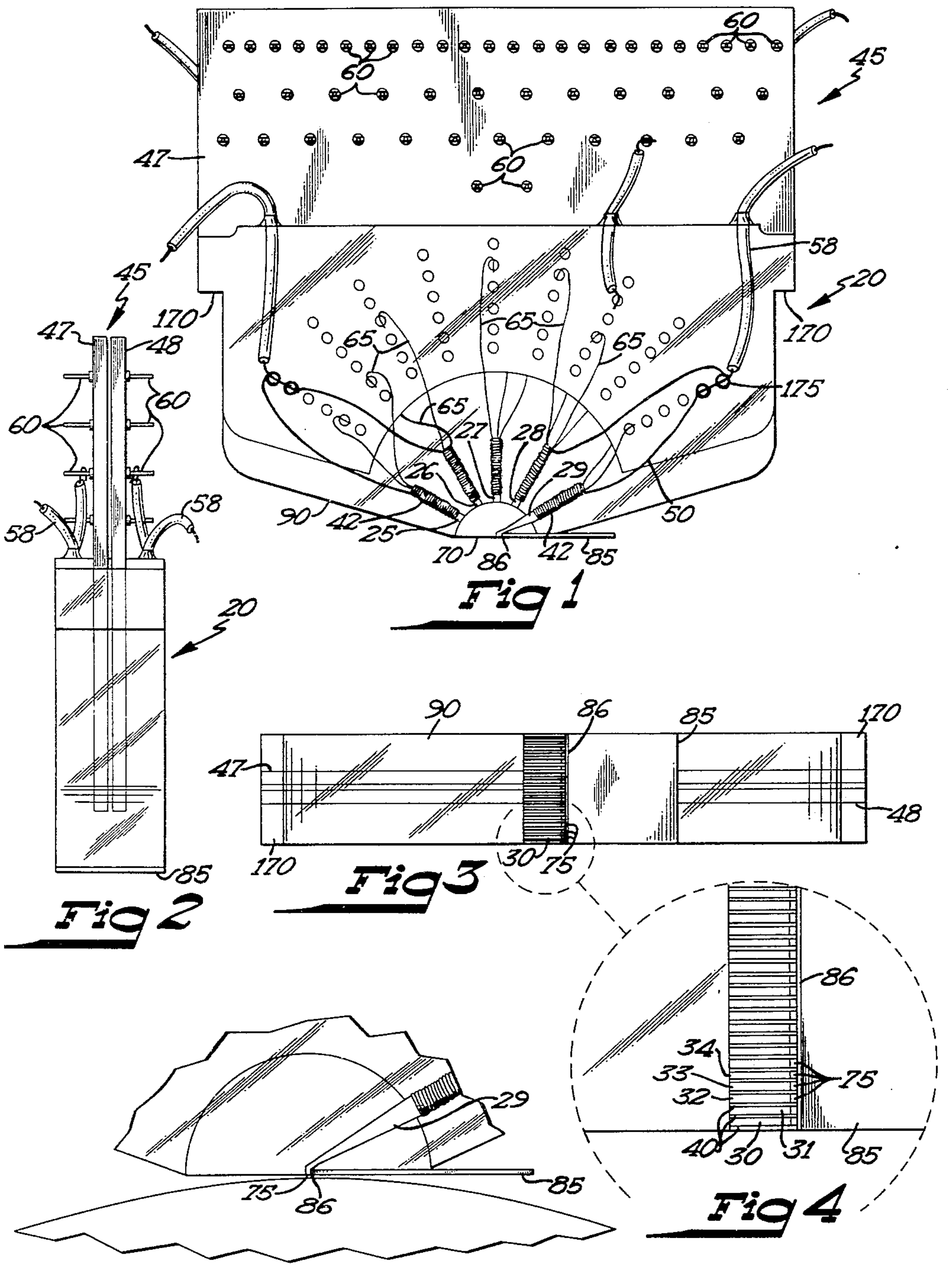
FIG. 1 is a plan view of the improved magnetic transducer for use with a magnetic recording medium.
FIG. 2 is an end elevation view of the transducer of FIG. 1.
FIG. 3 is a bottom view of the transducer of FIG. 1.
FIG. 4 is an enlarged view of an area encircled in FIG. 3 to show relationship of parts.
FIG. 5 is an enlarged view in elevation with parts broken away of the improved magnetic transducer associated with a magnetic recording medium.

My improved magnetic transducer for use with a magnetic recording medium is shown in the drawings in a completed form and in disassembled form to show the improved method of making the same. This magnetic transducer is particularly adapted for use as a magnetic recording head in a photocopy machine wherein input signals from an optical, or other type of scanner, energizes the head to provide a magnetic output from the same in terms of a plurality of bits of inforamtion on a magnetic storage surface such as a drum or belt, from which stored magnetic increments will be reproduced in terms of a picture or copy through the use of conventional print-out apparatus. The improved magnetic transducer is also utilized in connection with storage of a plurality of bits of material on a wide magnetic belt for information storage and computing apparatus. This improved magnetic transducer provides a high degree of information handling through the use of an extremely large number of individual core elements per width of the magnetic transducer as it scans a magnetic surface. As an example, the improved magnetic transducer herein, when used as a recorder, will provide 100 individual core members to generate 100 spaced parallel information paths on a magnetic storage medium in approximately one-half inch of transducer width. A plurality of such magnetic recording heads in a photocopying machine will provide a high degree of resolution in copying. A similar application in magnetic storage may be readily visualized.

Figure 10:
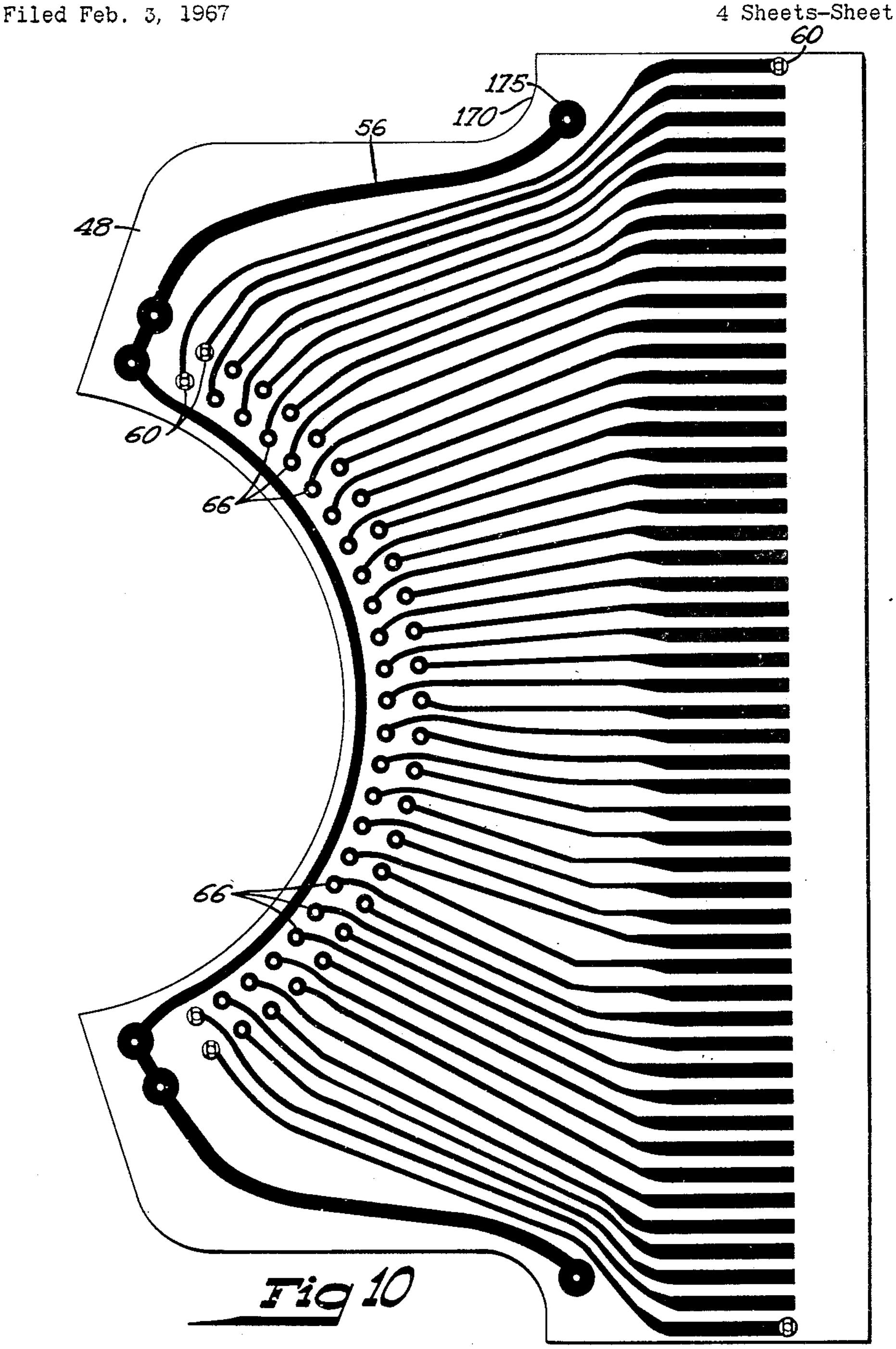
FIG. 10 is a plan view of a printed circuit used in the improved magnetic transducer.
Figure 11:
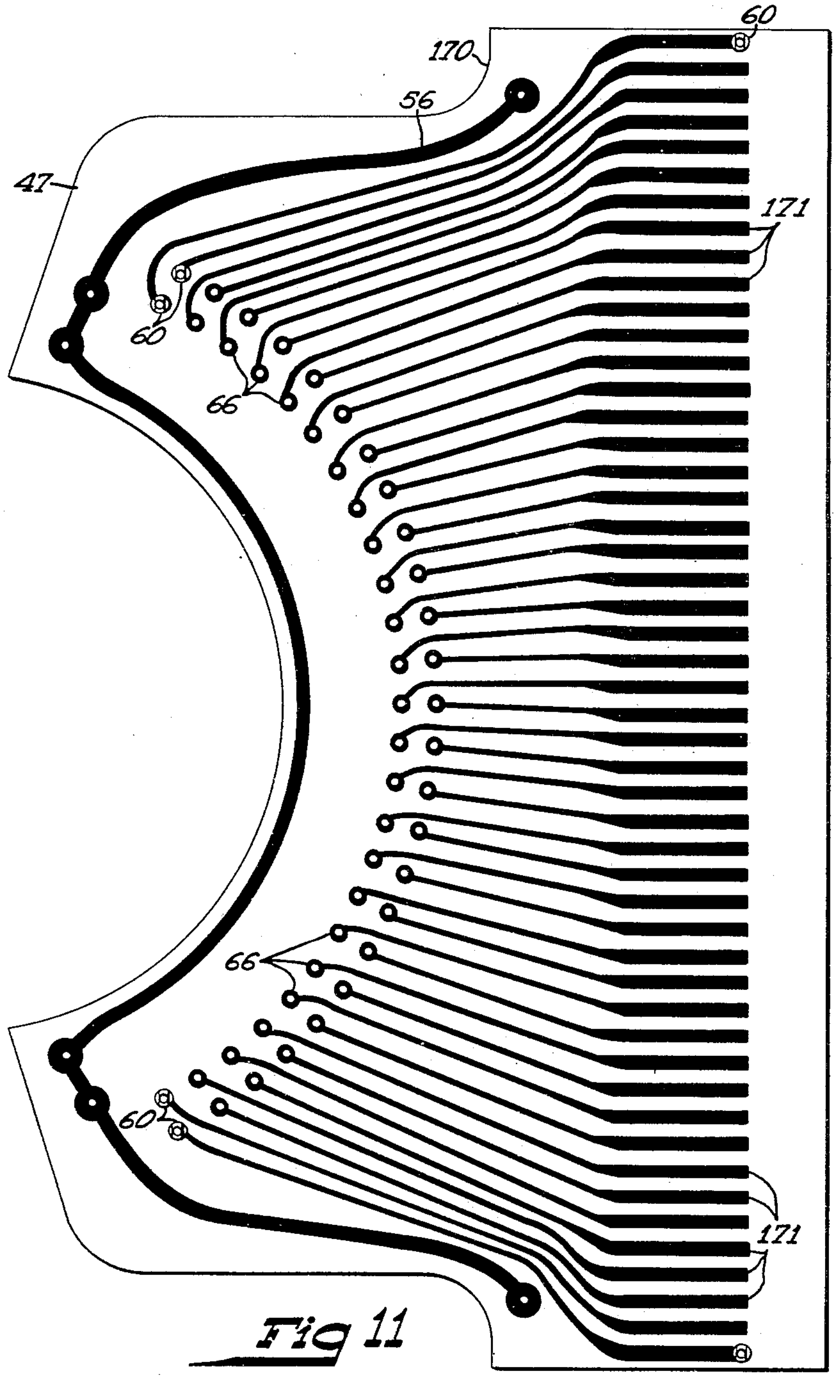
FIG. 11 is a plan view of another printed circuit used in the improved magnetic transducer.

This improved magnetic transducer or head utilizes a plurality of different shaped core members, such as is indicated at 25, 26, 27, 28 and 29 respectievly. As will be seen in the drawings, these core members are so displaced relative to one another because of their shape that they define a 30, 60, 90, 120, and 150 degree relationship from a horizontal plane passing through the face surface of the finished head, as well be hereinafter noted. In the magnetic transducer as disclosed herein, 20 sets of each type of core member are included in the array to provide the overall arrangement of 100 core members or styli making up the elements of the transducer. It will be recognized, however, that this number may vary, as desired, and that the particular angular relationship between the individual core members may also vary to increase or decrease the number of core members in the head and the angular relationship therebetween. Each of the respective types of core members 25–29 are mounted respectively in core holders which are made of a non-magnetic material such as brass plate. These core holders differ from one another in terms of angularly disposed slots therein to mount the particular shape of the core members 25–29. Thus as will be best seen in FIG. 8, the varying types of core holders are shown at 30–34 respectively each with a different shaped slot therein identified at 35–39 respectively. As will be best seen hereinafter in the disclosure of the method or process of making the magnetic transducer, non-magnetic and electrically conductive spacer members 40, made of a material such as brass, and in the same general shape as the core holders but without the slots therein are positioned between adjacent core holders and core members. In addition each of the cores has a separate winding thereon, as indicated at 42, which winding is distributed along the upper extent of the core members with one end of the winding being soldered or secured to the core member itself, as indicated at 43, and with the opposite extremity of the winding, as indicated at 44 being connected to a terminal assembly, indicated generally at 45. The individual core members are each made of a magnetic material, such as Permalloy, and the electrical circuit is formed by having one end of each of the windings in a common connection through the brass or non-magnetic but electrically conductive spacer plates. Thus one end of each winding is connected in common and the opposite extremity, as indicated by the separate lead conductors 44, extend to the treminal assembly 45 which is made up of two printed circuit connector boards 47, 48 shown respectively in FIGS. 10 and 11. The common connection for each of the coils through the magnetic cores and non-magnetic spacer members are periodically brought out through lead conductors, such as is indicated at 50, from certain of the cores themselves along the array of stacked laminations to a common conductor 56 on each of the terminal boards 47, 48 and through output or ground conductors or lead wires 58 to a separate circuit apart from the input to the head. The two printed circuit boards are disposed with the circuit elements facing one another, and a plurality of terminals, indicated generally at 60, are secured and extend through the circuit boards and connect conductors on the board to provide a plurality of output terminals which are adapted to be connected with external cabling to provide the input circuit to one end of each winding on the magnetic transducer. Each of the individual windings are connected from the lead wire through hand wiring leads indicated at 65, to one of the plurality of terminal points 66 having terminals (not shown) on the printed circuit board which terminal points are spaced along the surface of the same for each of the boards such that one end of each of the 100 windings on the 100 core members are connected thereto to provide a separate input circuit to the windings with common return circuit through the core members, the core holder and the lead wires 50 and 58 to a ground return circuit.

The lower or face extremity of the transducer, as indicated at 70, has a lapped surface which exposes the stacked array of core holders and spacer members for the 100 core members or styli and with tip portions of the core members exposed thereon. These tip portions will best be seen as the reduced portion 75 of each of the styli which have a taper at one extremity down to a straight portion angularly disposed thereto, except for the core member 27, in which the tip is aligned with the body of the core. Each of the core members in the initial form include a loop at the end of the styli or tip portion such as is indicated at 80, with an aperture 82 therein. As will be hereinafter noted, this loop portion is removed after assembly so that only the tip or stylus portion 75 forming the stylus for each of the core members will be exposed at the surface of the core holders. These will all be in alignment through an assembly process to be later defined and spaced from one another by virtue of the spacing provided with the spacer plates 40. The exposed face of the transducer includes in addition, a plate of magnetic material 85 which is generally rectangular in surface area extending the full width of the transducer with one edge being disposed parallel to the styli tips 75 for the stacked core members and with a thin non-magnetic spacer 86 positioned therebetween. Thus the plate 85 is equidistantly spaced from the edges of the styli tips of each of the core members and extends to one side of the core face across the width of the transducer and beyond the edge of the core holders to provide a substantial mass or cross-sectional area with respect to the combined cross-sectional areas of all of the styli tips for the transducer. The purpose of this will be hereinafter noted. The plate 85, with the spacer 86 and the exposed styli tips together with exposed edges of the core holder and spacer members, are lapped to provide a flat exposed surface on the finished transducer.

The body of the transducer is formed of a molded epoxy material, as indicated at 90, which material is actually applied in a mold with the core members, core holders and terminal assembly positioned in the mold such as to connect these parts together with the wiring between the windings and the terminal assembly. The epoxy in addition to forming a solid rigid structure holding the terminal assembly to the stacked array of core holders and core members with the windings thereon provides for electrical and magnetic insulation between the various parts of the transducer. As will be seen in FIG. 1, the terminals 60 on the terminal boards project out from the printed circuit sides of the boards 47, 48 and are adapted to have connected thereto lead wires (not shown) from a cabling assembly to provide the input circuit to the transducer when it is used as a recording device.

The molded assembly 90, as seen in FIG. 2 includes the terminal boards 47, 48 in a spaced relationship, and as seen in FIG. 3 from the bottom thereof includes the exposed core holders and styli tips 75 in a stacked relationship with the spaced member 40 therebetween. The styli tips or exposed tips of the core members are aligned to provide a large number of core elements for a given width of the transducer. The 100 core elements of the transducer are encompassed and enclosed in a transducer having a width of approximately one-half of an inch. In the use of photocopying machines, a plurality of such transducers in a side by side or stacked relationship across the width of a storage drum or magnetic belt of conventional copy size, will provide an extremely large number of coil elements to define magnetic increments or areas of the storage drum which will provide a visual record of the material copied with a high degree of resolution. The core members as disclosed herein are of the discontinuous type in that they are straight core members with an incomplete magnetic circuit. The input winding or winding on each of the core members is positioned on the enlarged portion of the same and the core members are physically spaced from one another angularly in a side by side relationship in the stacked array to provide clearance for the windings thereon. The magnetic circuit for the core members extends through the reduced tip portion and across an air gap defined by the spacing between the magnetic medium or surface with which the transducer is associated and the tip extremities, through a surface of the magnetic material or the magnetic medium and back across the air gap to the magnetic plate or sink 85. As will be hereinafter noted, the transducer is adapted to be positioned in proximity with the storage medium such that the air gap therebetween will be less than the spacing between the styli tips and the magnetic plate as defined by the spacer member 86 which dimension is also less than the thickness of the magnetic spacer plates 40 between the individual core members. Thus the path of least reluctance for the signal generated in the core member by the windings thereon is across the gap between the head and the magnetic surface with which the head is associated plus the gap back from the surface to the magnetic plate 85. This combined distance will thus be less than the distance from one tip to an adjacent tip through the air path to the magnetic medium or from one tip directly through air to the magnetic sink 85. This will eliminate the possibility of cross talk or stray magnetic flux magnetizing increments on the magnetic surface of the medium which is not directly below the styli energized. The actual construction of the magnetic transducer, which may vary in form from that as disclosed above, provides a simplified arrangement for manufacturing and assembly into a complete transducer having a large number of small and difficult to handle parts.

Figures 6, 7, 8, 9:
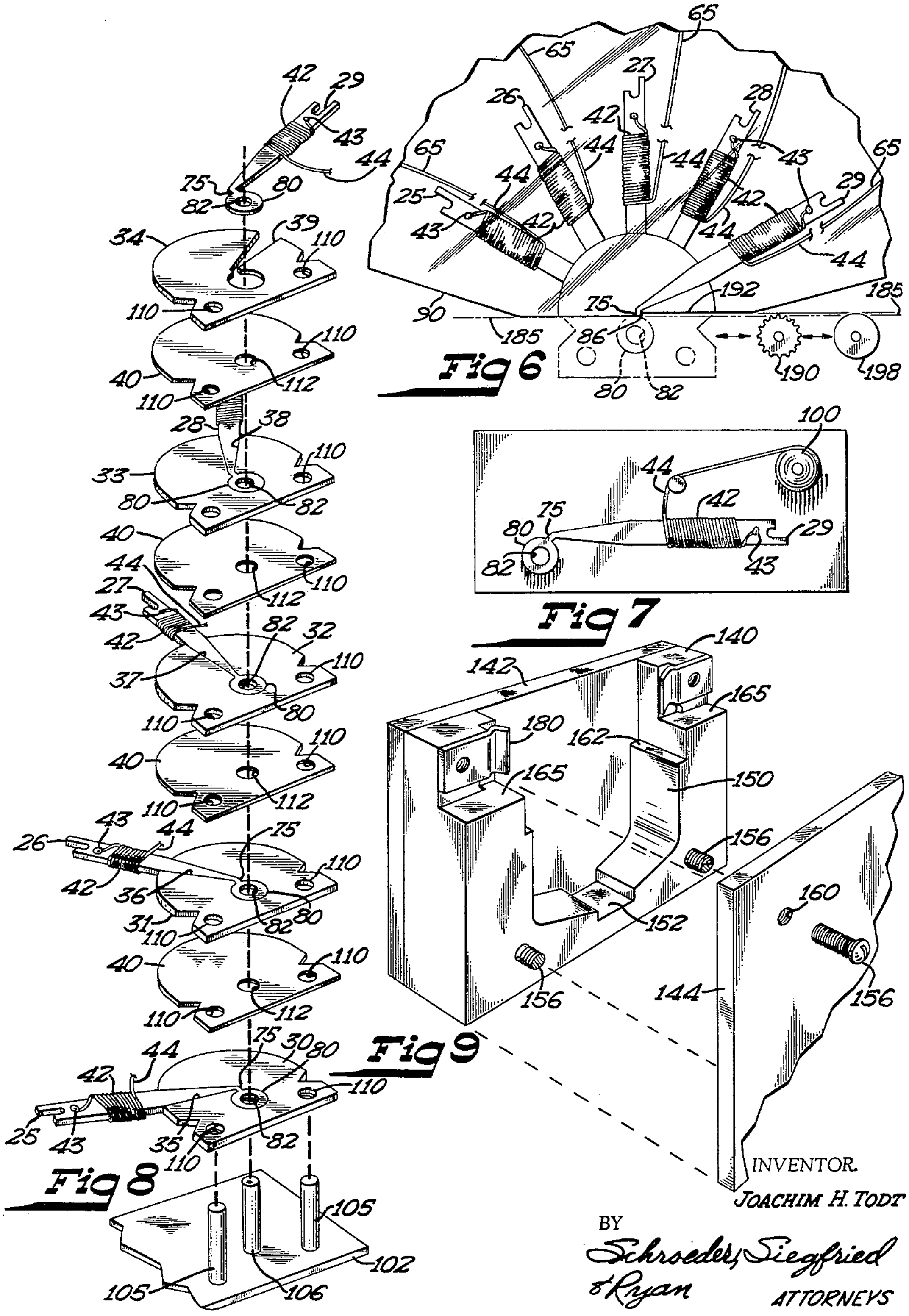
FIG. 6 is an elevation view of a portion of the improved magnetic transducer during assembly.
FIG. 7 is a plan view of a core member for the improved magnetic transducer with a winding thereon.
FIG. 8 is an exploded view of a portion of the improved magnetic transducer.
FIG. 9 is a perspective view of a mold used in the assembly of the improved magnetic transducer.

My improved magnetic transducer which comprises a plurality of small parts is made by an improved method of assembly as will be hereinafter described. The individual core members or styli for the embodiment of the apparatus as disclosed herein are made of a magnetic material of 0.004 inch in thickness, the material preferably being that identified by the trade name "Permalloy." While other materials may be utilized, and varying thickness may be utilized for this purpose, it has been found that the magnetic transducer will provide approximately 100 core elements in 0.57 inch of transducer width. The styli 25–29, as will be seen in the drawings, take on different shapes such that they may be angularly disposed from one another in the core holder such that the windings 42 thereon will be electrically spaced from associated windings on adjacent core members. After the individual core members have been formed, through any suitable type of manufacturing process such as stamping, and the individual core members have been properly treated and handled to provide for a uniform thickness and desired magnetic characteristics, a winding is placed on the same such as is indicated in FIG. 7. This may be accomplished through a conventional winding type operation. The winding is distributed over the upper or main body extent of each of the core members and the number of turns of the same will vary depending upon the desired electrical characteristics for the same. Thus as it will be seen in FIG. 7, the winding 42 is distributed along the upper or main body extent of the core member through a suitable winding process and apparatus, such as is indicated schematically at 100. One extremity of the winding is secured or soldered to the core member, as indicated at 43. The individual core members with the windings thereon are then set in the respective core holders in the slots 35–39 positioned therein to accommodate the various shaped styli or core members. The individual core members are further tapered toward the extremity which does not carry the winding and have stylus portion 75 of the uniform width terminating in the circular loop 80 at the extremity of the same with the aperture 82 therein. The slots are shaped to fit snugly around the core members at the tapered extremity of the same so that the individual core members will be positively positioned in the core holders 30–34 respectively. For the particular magnetic transducer, 20 sets of each of the core members of each type are positioned in an assembled relationship and these are stacked on a jig or frame 102 having pins 105 and 106 thereon. The core holders 30–34 include apertures 110 at the lower extremities of the same and these apertures are adapted to fit over the pins 105 of the jig with the pin 106 extending through the aperture 82 in the loop or ring portion 80 on the end of the core member. This will positively define or locate the core member and the core holder by mounting the same on the jig. Similar apertures 110 and 112 in the spacer plates 40 permit the spacer plates to be interleaved between adjacent core members and core holders. The stacking of the core members will be in a progressive order of angular displacement of the core member with respect to the core holder such that the first core holder on the jig will be that in which the main body extent of the core member is displaced roughly 30 degrees from the horizontal or base of the core holder. A spacer plate 40 having a shape similar to that of the core holder without the slot therein is next positioned in the stacked array, this spacer plate being of a brass or non-magnetic material and having a thickness of approximately 0.0017 inch. The next core member mounted thereon is that which bears the relationship of approximately 60 degrees to the horizontal followed by a non-magnetic spacer plate 40. In successive order, the core members which bear the relationship 90, 120 and 150 degrees to the horizontal or starting reference base will be added with intermediate spacer plates 40 therebetween. Once a complete array is mounted on the jig, the process is repeated starting from the 30 degree point and this stacking will continue until a total of 100 core members and core holders together with intermediate spacer plates are positioned on the jig. In this arrangement, the core holders with core members therein having the same angular displacement with respect to the horizontal will be sufficiently spaced apart to provide adequate electrical and mechanical clearance for the windings mounted thereon. Thus in this arrangement, it is possible to provide a large number of core members in the stacked relation without interference with adjacent core members and the windings thereon. The individual styli tips 75 of each of the core members will lie in the same plane and the loops on the extremities of the same will be disposed on the pin 106 and concentric therewith.

This entire assembly is mounted in a mold structure 140 which mold structure has removable side plates 142, 144 included therewith. The mold structure has a recess 150 therein with a notch 152 at the bottom of the same into which the jig assembly with the stacker laminations of core members, core holders and spacers is positioned. As will be hereinafter noted, suitable pins or screws 156 fitting through apertures 160 in the side plates are utilized for positioning the plates 142, 144 onto structure 140 to complete the mold structure. Further the mold structure has a recess or shoulder as at 162, and a notched edge 165 for purposes to be later noted. After the assembly of stacked styli is positioned in the mold, the pair of printed circuit connector boards 47, 48 are positioned therein with the circuit sides facing one another. The edges of the boards are designed to fit into the recess or notch 162 in the mold such that a shoulder portion 170 on the boards will rest thereon. The individual circuit boards have a plurality of distributed straight line conductors 171 etched or suitably impressed on the boards with each of these conductors having a loop at the end of the same through which a suitable terminal is positioned, such as is indicated at 172. Similarly at the upper extremities of the conductors, the terminals 60 extend through from the opposite side and are connected to the conductor surface. The free extremity of each winding 44 on the individual core members is then connected to one of the various conductors 171 positioned on the board to make a circuit on the surface of the board to a corresponding terminal 60 at the upper extent of the same. The upper ends of the terminal board, if desired, may be used with a plug-in type connector having associated brush portions which would contact the broad extremities of the conductors 170 at the upper end of the same.

The individual boards 47, 48 are thus positioned in the mold with a suitable spacer between the two to insure that the conductive suraces do not contact one another. The individual lead wire or extremities of the windings 42 are then connected to the terminal 172 of the various conductors on the printed circuit board for the entire 100 windings on the core members. The printed conductors for each board will provide 50 circuits with a common return conductor, as indicated at 56 which will be used for varying connections for the common return. Since the core members are all positioned in abutting relationship with the respective core holders and the spacer members 40 therebetween, all of which are of the metallic material both magnetic and non-magnetic but electrically conductive, the common assembly is grounded such that each winding is grounded in common with all of the windings on all of the core members in the array. At selected points along the stacked laminations, the conductors 50 will be brought out from the extremity of one core member and connected to the conductors 58 to provide for an increased load carrying capacity of the common return circuit. Terminals 175 on the common conductor 56 will be connected to the lead wire 58 leading out from the printed circuit board remote from the individual and separate input circuits as evidenced by the varying conductors 171 on the remaining portion of the boards 47 and 48. Several of these common return conductors will be brought out to increase the load carrying capacity of the common return circuit with the conductors being connected in common at a remote point.

When all of the electric wiring is completed, the circuit boards will be held in a spaced relationship by means of spring clips 180 positioned in the notch 165 in the mold and held in position by the screws or pegs 156. The sides 142, 144 are then assembled on the mold structure 140 and the completed mold is then filled with an epoxy resin or other suitable thermosetting material which is poured into the mold to join the completed assemblies together. The thermosetting material will be poured into the mold up to the level of the notch 165 in the mold so that the lower edges of the printed circuit boards will be physically connected through the thermosetting material to the stack assembly of the core members, core holders and spacer members. Once the thermosetting material has been cooled and set and the sides of the mold 142, 144 removed, the ultimate assembly will appear as indicated in the partial sketch of the same in FIG. 6 with the overall appearance being that shown in FIG. 1. It will be noted that the lower half of the varying core member holders which contain the apertures 110 and the aperture in which the loop 80 at the end of the styli is positioned, is removed. The jig 102 with the pins 105, 106 thereon may be separately released through any suitable means or may be machined off in a conventional manner. As shown in FIG. 6, the lower portion of the assembled core holders with the thermoplastic material will be machined along the dotted line indicated at 185 through a suitable milling process or cutting process such as is suggested schematically by the cutting tool 190. This will expose the styli tips 75 of each of the core holders along with a portion of the core holders which are held together in assembled relationship by the epoxy material 90. After the initial machining to provide a flush surface 185, a recess as indicated by line 192 is machined into one-half of the surface of the core holders up to the edge of the styli tip portions 75. In this recess or notch 195 is positioned the plate of magnetic material 85 which forms the magnetic sink, as will be hereinafter defined. Prior to the positioning of the plate 85 therein, a thin layer of brass or a non-magnetic strip having a width of approximately 0.0005 inch in indicated at 86, is cemented or suitably secured against the exposed edge of the styli tip portions 75 in aligned relationship across the width of the transducer. Similarly the plate 85 is positioned abutting the non-magnetic spacer strip 195, the plate having a thickness which is slightly larger than the exposed length of the styli tips in the notch 192. Plate 85 is held in recess 192 through a suitable adhesive material. It has been found that any adhesive which will bond metal to the epoxy may be utilized for this purpose. The actual thickness of the adhesive layer will vary depending upon the application but will be 0.001 to 0.005 inch thick. After the plate 85 has been inserted and cemented into the recess, the entire lower surface of the transducer is lapped through a suitable grinding process to provide a smooth lapped surface at the lower exposed end of the same. Thus as indicated in FIG. 6, a suitable grinding or lapping wheel such as is indicated at 198 will be utilized to lap the surface of the plate 85, the exposed end of the tips 75 of all of the core members and the exposed edges of the core holders 30–34 and spacer members 40 to provide a smooth surface with these extremities all being disposed in the same plane.

In FIGS. 3 and 4 of the drawings, a bottom view of the transducer is shown with the plate 85 in position and the non-magnetic spacer shim 86 disposed between the plate and the ends of the styli 75. FIG. 4 is an enlargement of a portion of this bottom view showing the relationship of parts. As previously stated and as will be best seen schematically in FIG. 4, the core holders and the styli tips are of the same thickness dimension, being in the neighborhood of 0.004 inch with the non-magnetic shims or spacers 40 having a thickness dimension of 0.0017 inch. Similarly the non-magnetic spacer 86 disposed along the edges of all of the styli in assembled relationship has a thickness in the neighborhood of 0.0005 inch but the cement covering of the same will increase this dimension. Similarly it will be evident that the mass of the plate or sink is significantly larger than the cross-sectional mass of the exposed styli tips and this plate will act as a return path for the flux lines eminating from the individual styli tips through the magnetic medium to be associated with the transducer such that the flux will enter the magnetic plate in the same manner as if the magnetic circuit had been completed. The magnetic plates or sink will offer the line of least resistance to the flux flow since the individual styli or core members are of the discontinuous type providing no return path as such to complete the magnetic circuit. This simplified arrangement provides for elimination of much of the mass of the magnetic circuit and provides further for the ability to arrange a plurality of core members in a single transducer head. Once the individual heads are lapped or surfaced to provide a disposition of the tips of the core members in the same plane as the exposed surface of the magnetic sink, the transducer may be connected through suitable cabling to the terminals of any desired input circuit.

As disclosed in FIG. 5, the improved magnetic transducer head is adapted to be used in connection with a magnetic recording medium which may take the form of a magnetic drum or tape as desired. The actual head is adapted to be spaced in such proximity with magnetic surfaces to provide a very small air gap therebetween, as indicated above.

The improved magnetic transducer is in effect a stack of alternately 0.004 inch and 0.0017 inch thick plates of nonmagnetic material such as brass. The 0.004 inch thick plates are slotted to extend one stylus portion of each core member each. In using the horizontal line as a reference, the slots therein are provided in the plates at 30, 60, 90, 120 or 150 degrees from the horizontal and the plates are stacked sequentially in that order. The individual core members making up the improved method of assembly for a magnetic transducer have windings on the body portion of the same with one end of each winding being electrically connected to the stylus itself to form a conductive path to a ground through the brass spacer plates and neighboring styli. The other end of each of the windings are connected to the input of the recording head through the separate printed circuit conductors on the terminal board and through the terminals at the extremities of the same to the cabling assembly leading to the input of the transducer. In making up the 100 individual styli for the head, 20 sets of the array of five separate angularly displaced core members are used. It will be recognized that varying angular relationships, varying numbers of cores in an array, and different shaped core holders may be utilized. In the assembly, the stylus holder, spacer plates and styli are assembled on suitable pins through the locating holes provided in the extremities of each. After the styli or core members are assembled in a stacked relationship with the styli tips aligned, the windings thereon are connected to the printed circuit boards to provide the electrical input circuits. Thereafter, the core members and circuit boards are placed in the mold and covered with an epoxy or other suitable thermosetting plastic which joins the circuit boards and core members into a unitary structure. The epoxy will provide mechanical strength for the transducer as well as making magnetic and electrical insulation for the parts thereon. After removal of the assembly from the mold, the lower portion of the stylus assembly including the stylus, the stylus holders and the plates are machined and lapped such that the stylus tips or ends are properly exposed and the magnetic sink is positioned in the assembly along with the spacer therebetween. The magnetic transducer thus will contain approximately 100 individual styli or core members with the approximate width of the head at 0.57 of an inch. In the use of photocopying machines, 15 identical heads will be required to produce an 8½ inch wide recording head. A similar arrangement of parts varying in the number of individual styli and the number of individual heads may be utilized for magnetic storage for any purpose such as in computing apparatus. The use of the magnetic sink eliminates cross talk which might occur when a given stylus is energized and would cause energization of an adjacent stylus in the head to provide a false increment of magnetization on the storage media. The magnetic sink provides a preferential flux path for the flux of the energized stylus tip. The magnetic flux will take the path of least reluctance and the surface of the magnetic storage media being immediately below and aligned with the individual styli in the transducer will be magnetized by the flux generated in the core member. The flux path between the magnetized stylus and the magnetic sink or plate 85 should be the second most preferential path and the introduction of the non-magnetic spacer member 86 between the individual styli and the plate will insure that flux lines will be directed into the magnetic medium with which the transducer is to be utilized. The flux path between the magnetized styli and the neighboring styli will be the least desirable and the individual non-magnetic spacers 40 insure that cross-talk is eliminated.

In considering this invention, therefore, it should be recognized that variations may be made in the shape and arrangement of the individual parts. Therefore in considering this invention it is intended that the present disclosure be illustraitve only and the scope of the invention should be determined by the appended claims.

What is claimed is:

1. A magnetic transducer for use with magnetic recording media comprising, a plurality of elongated core members, said core members having reduced width tips at one extremity and being positioned in a stacked relationship with the extremities of the tips of all of the core members being aligned, winding means positioned on each of the core members remote from the aligned tips, a plurality of non-magnetic electrically conductive spacer members disposed between said core members in electrical contact therewith, one end of each winding means being electrically connected to said corresponding core member, connector means including a plurality of terminals each connected respectively to the other ends of said winding means and said core members, a phenolic cover surrounding the core members with the winding means thereon and the connector means connected thereto to provide a solid and insulated assembly, and a magnetic sink in the form of a plate-like member attached to the assembly adjacent the aligned tips of the core members and equally spaced from all of the core members.

2. The magnetic transducer of claim 1 and including non-magnetic core holder members each mounting a core member and included within the phenolic covering.

3. The magnetic transducer of claim 2 and including a non-magnetic spacer means positioned between each of the core members mounted in the core member holders.

4. The magnetic transducer of claim 3 and including a non-magnetic spacer strip positioned between the aligned tips of the core members and the platelike member of magnetic material defining the magnetic sink.

5. The magnetic transducer of claim 4 in which the platelike member of magnetic material has a surface area in the plane of the tip extremities of the aligned core members which is at least ten times larger than the cross-sectional area of all of the tips of the core members disposed adjacent thereto.

6. The magnetic transducer of claim 5 in which the magnetic sink formed of a platelike member of magnetic material is common only to the aligned tips of the core members.

7. The magnetic transducer of claim 3 in which the non-magnetic spacer means positioned between each of the core members in adjacent relationship provides a gap between said core members which is greater than the gap provided by the non-magnetic strip positioned between the magnetic sink and the aligned tips of the core members which gap is also greater than the distance between the magnetic head and a magnetic surface with which the magnetic head is adapted to be associated.

8. The magnetic transducer of claim 4 in which the tip extremities of the core members and the flat surfaces of the magntic sink lie in the same plane.

9. The magnetic transducer of claim 5 in which each of the elongated core members have a straight body portion which is tapered at one extremity to a substantially reduced width equal to the thickness of the core member to define the tip and in which the core member holders have slots therein shaped symmetrically with the tapered extremities of the core members to mount the same.

10. The magnetic transducer of claim 9 in which the slots in the core member holders for adjacent core members are angulary disposed from one another to angularly dispose and space the straight body portions of adjacent core members with the winding means thereon in stacked relationship.

11. The magnetic transducer of claim 1 in which the connector means includes a pair of printed circuit boards and terminals connected thereto with the extremities of the winding means on the core members being connected to the printed circuit board to complete a circuit to the terminals from the extremities of the winding means.

12. The magnetic transducer of claim 2 in which the elongated core members are formed with a straight body portion upon which the winding means is positioned, and a reduced tip portion which is mounted in the core member holder for each core member, each tip having a width dimension substantially equal to the thickness dimension of the core member and in which the core members bear a relationship to the tips such that the straight body portions thereof are angularly displaced from each other in the stacked relationship.

13. A magnetic transducer adapted to be used with a magnetic storage medium comprising, a plurality of elongated discontinuous core members having reduced tip extremities, the core members being mounted in a stacked relationship such that the tips are aligned, magnetic spacer means positioned between the tips of each of the core members in the aligned and stacked relationship, coil means positioned on a portion of the elongated core members remote from the tip, a plurality of nonmagnetic electrically conductive spacer members disposed between said core members in electrical contact therewith, one end of each coil means being electrically connected to said corresponding core member thereby forming a common conductor, and a plate of magnetic material positioned adjacent the tips of the core members in aligned relationship and spaced equidistantly from all of said tips of said core members with a surface of said plate of magnetic material being disposed in the same plane as the exposed extremities of the tips of the core members, the magnetic head being adapted to be positioned adjacent the magnetic storage medium such that flux lines directed from the tips will pass through the medium and back to the plate of magnetic material.

14. The magnetic transducer of claim 13 in which the magnetic spacers between the tips of the core members provide a larger gap than the spacing between the plate and the aligned tips combined with the normal distance between the tip extremities and the magnetic storage medium with which it is adapted to be associated.

15. The magnetic transducer of claim 14 in which the physical mass of the plate of magnetic material exceeds the mass of all of the tip portions of the core members in aligned relationship.

References Cited

UNITED STATES PATENTS

| | | | |
|---|---|---|---|
| 3,156,919 | 11/1964 | Rutter | 346—74 |
| 3,166,740 | 1/1965 | Brette | 340—174.1 |

BERNARD KONICK, Primary Examiner

WILLIAM F. WHITE, Assistant Examiner

U.S. Cl. X.R.

29—603; 179—100.2; 346—74